Sept. 28, 1937.    A. L. FREEDLANDER    2,094,008
RUBBER ROLL
Filed Sept. 30, 1936
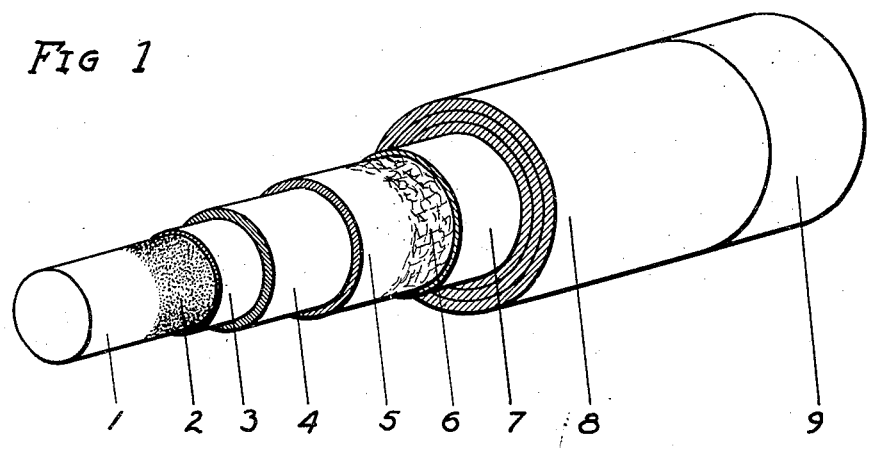
Fig 1
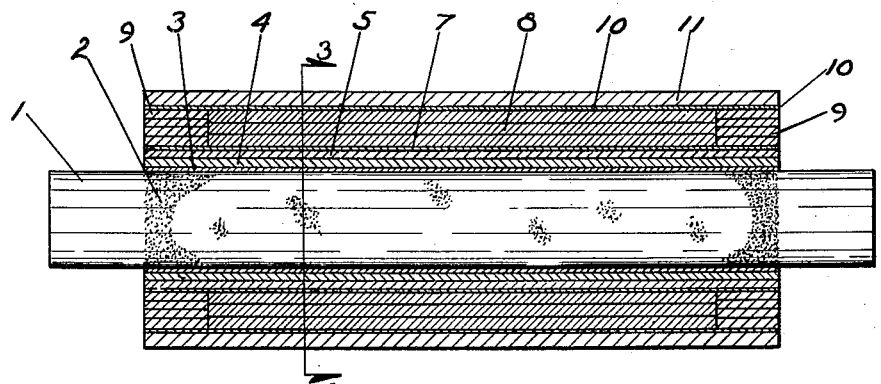
Fig 2
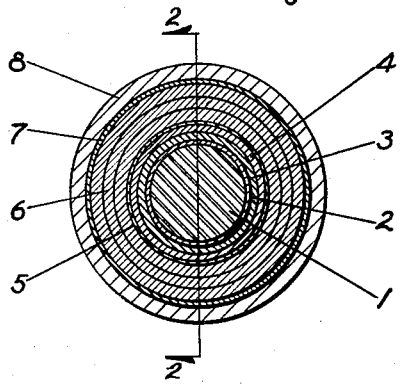
Fig 3
INVENTOR
ABRAHAM L. FREEDLANDER
BY
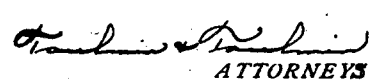
ATTORNEYS Patented Sept. 28, 1937

2,094,008

UNITED STATES PATENT OFFICE 2,094,008

RUBBER ROLL

Abraham L. Freedlander, Dayton, Ohio, assignor to The Dayton Rubber Manufacturing Company, Dayton, Ohio, a corporation of Ohio Application September 30, 1936, Serial No. 103,414

11 Claims. (Cl. 91—67.8)

My invention relates to rollers and particularly rollers for printing purposes.

It is the object of my invention to provide a printing roller in which the ends of the roller and the surfaces of the roller are so protected as to be impervious to inks, acids, alkalis and cleaning compounds used for removing inks from rollers.

It is a further object to provide such a roller that is resilient, while at the same time it has this impervious surface that is smooth, relatively hard, but has the desired tack.

In particular, it is my object to provide a printer's roller built up of a plurality of layers of relatively soft rubber, the ends of which are engaged by collars of inert, resilient material, and the surfaces of both the collars and of the rubber roller are covered by a layer of inert material so that the interior body of rubber, which is sensitive to oils, greases and clean-up compounds, is completely protected.

Referring to the drawing:

Figure 1 is a perspective of the steel shaft of the roller and the various layers of the roller cut away to indicate the arrangement and composition thereof. The thickness of the layers is not indicative of their true proportions but is illustrative only, as this view and the following views are diagrammatic.

Figure 2 is a vertical section through the roller showing the steel axle in elevation. Figure 2 is a section on the line 2—2 of Figure 3.

Figure 3 is a section on the line 3—3 of Figure 2.

Referring to the drawing in detail, 1 is a steel axle which is sandblasted at 2. This is followed by a coating of hard rubber cement 3. The composition of this hard rubber cement is the following: rubber, sulphur, zinc oxide, clay, whiting, mineral oil or palm oil, phenyl-beta-naphthalamine, hexamethylenamine; and benzol, in the proportion of one pound of the foregoing ingredients to one gallon of benzol.

A thin sheet of hard rubber 4 followed by a thin sheet of soft rubber 5 is wound upon the axle. The whole structure is then vulcanized by the hot water process. By this process the structure is submerged in a container of hot water under pressure and is kept there sufficiently long to effect the curing. The approximate temperature of the water is 250 to 260 degrees Fahrenheit and the pressure is from 150 to 200 pounds. The approximate period of time for this article to be kept in the water is 3 to 6 hours.

The surface 5 which is so vulcanized is then roughened with a wire brush as indicated at 6. On this roughened surface, two coats of a rubber cement, such as the synthetic rubber cement "Duprene", are applied. The composition of this cement is as follows: A chloroprene derivative of mono-vinyl-acetylene, zinc oxide, magnesium oxide, sulphur, cumar, resin, cottonseed oil; and benzol, in the proportion of one pound of the foregoing ingredients to one gallon of benzol.

These two coats of cement are indicated at 7. Thereafter the soft rubber base is wound in sheet form as indicated at 8. Simultaneously sheets of an inert material such as "Duprene" are wound in sheet form on either end of the roller of soft rubber 8. These collars are indicated at 9.

Thereafter the completed roller is vulcanized by the hot water process and the surface is ground. For instance, a roller at this stage having a diameter of 2½ inches is ground down to 1.86 inches. Thereafter a layer of "Duprene" cement is again applied to the surface as at 10.

A "Duprene" sleeve is prepared on a mandrel. The exterior surface of this sleeve is roughened and treated with a coat of "Duprene" cement. The sleeve is then removed from the mandrel, inverted and blown onto the roller heretofore described. The "Duprene" cement 10 has already been placed on the surface of the roller. This sleeve 11 then covers both the main portion of the roller 8 and the collars 9. The end of the sleeve 10 extends slightly beyond the roller so that a workman can shear the surplus flush with the end of the rest of the material constituting a roller. This shearing is done after vulcanization and permits bringing the width of the roller to the exact size desired.

Thereafter vulcanization is carried out in hot air at a temperature of approximately 270 degrees Fahrenheit at an air pressure of 50 pounds for a period of one hour.

After vulcanization, the surface is finished and ground.

When I refer to "Duprene", I refer to any product that is resilient, is capable of being vulcanized into a hard, smooth body with a tacky surface, and is inert to such materials as oils, greases, acids, alkalis and clean-up compounds that normally affect rubber.

It will be understood that I desire to comprehend within my invention such modifications as come within the scope of my claims and my invention.

Having thus fully described my invention, what I claim as new and desire to secure by Letters Patent, is:

1. In a printing roller, the combination of a soft rubber body, a supporting axle, end collars of a resilient material inert to oils, greases and ink cleaning compounds, and an enclosing sleeve of the same material.

2. In combination, in a printing roller, of a steel axle, a vulcanized coating thereon, a wound resilient rubber body mounted thereon, end collars of wound, resilient material inert to oils, greases and ink cleaning compounds, and a sleeve encasing said collars and rubber body, said sleeve being composed of the same material as said collars.

3. In combination, in a printing roller, of an axle, a soft rubber body consisting of a sheet of soft rubber wound upon the axle of said body, collars on either end of said soft rubber body for protecting said body, and a sleeve mounted on said soft rubber body and said collars for completely enclosing said soft rubber body.

4. In combination, an axle, a rubber coating vulcanized thereon, a soft rubber body mounted thereon, protecting collars mounted thereon at the ends of said soft rubber body and flush therewith, and a sleeve of protecting material mounted on said collars and said soft rubber body.

5. In combination, an axle, a rubber coating vulcanized thereon, a soft rubber body mounted thereon, protecting collars mounted thereon at the ends of said soft rubber body and flush therewith, and a sleeve of protecting material mounted on said collars and said soft rubber body, said sleeve being composed of a flexible material which is inert to such materials as oils, greases and compounds for cleaning up ink on printing surfaces.

6. In combination, a steel axle having a sandblasted surface, hard and soft rubber sheaths cemented and vulcanized thereto, said sheaths having a roughened surface; a soft rubber body cemented thereto, end collars mounted thereon adjacent the ends of said soft rubber body; and a sleeve mounted over said collars and said soft rubber body.

7. In combination, an axle having a sandblasted surface, a vulcanized rubber cover for a portion of said surface, a cemented wound body of soft rubber composed of a soft rubber sheet wound on a portion of said vulcanized surface, and wound collars on either end of said soft rubber body, said roller so formed being vulcanized.

8. In combination, an axle having a sandblasted surface, a vulcanized rubber cover for a portion of said surface, a cemented wound body of soft rubber composed of a soft rubber sheet wound on a portion of said vulcanized surface, wound collars on either end of said soft rubber body, said roller so formed being vulcanized, and a sleeve mounted on said roller covering the soft rubber body and collars and vulcanized thereto.

9. In combination, an axle having a sandblasted surface, a vulcanized rubber cover for a portion of said surface, a cemented wound body of soft rubber composed of a soft rubber sheet wound on a portion of said vulcanized surface, wound collars on either end of said soft rubber body, said roller so formed being vulcanized, and a sleeve mounted on said roller covering the soft rubber body and collars and vulcanized thereto, said sleeve having a ground surface.

10. In combination, an axle having a sand blasted surface, a layer of rubber cement, a layer of soft and hard rubber vulcanized thereto, said hard rubber having a roughened surface, a cement coating; a wound rubber body of soft rubber mounted thereon, wound collars of resilient material inert to oils and greases mounted thereon on either end of said soft rubber body, said rubber bodies being vulcanized thereto; and a sleeve inert to oils and greases mounted thereon and vulcanized thereto.

11. In a printing roller, the combination of a vulcanized rubber surface on an axle, a relatively soft rubber body enclosed at its ends by protecting collars vulcanized to said rubber coating on the axle, and a vulcanized sleeve mounted on said rubber body and its collars.

ABRAHAM L. FREEDLANDER.